United States Patent [19]
Yamaguchi

[11] Patent Number: 4,987,982
[45] Date of Patent: Jan. 29, 1991

[54] SYSTEM FOR ALLEVIATING SELECT SHOCK IN AUTOMATIC TRANSMISSION

[75] Inventor: Hiroshi Yamaguchi, Yokohama City, Japan

[73] Assignee: Nissan Motor Company, Limited, Yokohama City, Japan

[21] Appl. No.: 258,274

[22] Filed: Oct. 17, 1988

[30] Foreign Application Priority Data

Oct. 16, 1987 [JP] Japan ............................. 62-259774

[51] Int. Cl.⁵ .......................................... B60K 41/22
[52] U.S. Cl. ........................... 192/3.57; 192/0.076; 192/109 F; 74/867
[58] Field of Search ............ 192/3.57, 0.092, 0.076, 192/109 F; 74/867

[56] References Cited

U.S. PATENT DOCUMENTS

| | | | |
|---|---|---|---|
| 3,174,500 | 3/1965 | Johnson et al. | 137/115 |
| 3,621,735 | 11/1971 | Lemieux | 74/753 |
| 3,623,382 | 11/1971 | Chana | 74/864 |
| 3,640,301 | 2/1972 | Jania | 137/101 |
| 3,709,066 | 1/1973 | Burez | 74/866 |
| 3,750,495 | 8/1973 | Ito et al. | 74/866 |
| 4,076,036 | 2/1978 | Taft | 137/118 |
| 4,125,038 | 11/1978 | Hiramatsu | 74/869 |
| 4,274,308 | 6/1981 | Iwanaga et al. | 74/869 |
| 4,369,804 | 1/1983 | Bouvet et al. | 137/85 |
| 4,430,910 | 2/1984 | Lemieux et al. | 74/867 |
| 4,432,255 | 2/1984 | Borman et al. | 74/869 |
| 4,462,280 | 7/1984 | Sugano et al. | 74/868 |
| 4,485,695 | 12/1984 | Kawamoto | 74/869 |
| 4,527,448 | 7/1985 | Person et al. | 74/869 |
| 4,631,982 | 12/1986 | Miki et al. | 74/869 |
| 4,633,738 | 1/1987 | Timte | 74/869 |
| 4,638,689 | 1/1987 | Sakai | 74/866 |
| 4,660,441 | 4/1987 | Young | 74/867 |
| 4,680,992 | 7/1987 | Hayasaki et al. | 74/869 |
| 4,711,317 | 12/1987 | Sakakiyama | 192/0.076 |
| 4,722,250 | 2/1988 | Sumiya et al. | 74/867 |
| 4,730,521 | 3/1988 | Hayasaki et al. | 74/867 |

FOREIGN PATENT DOCUMENTS

| | | |
|---|---|---|
| 55-24222 | 2/1980 | Japan . |
| 58-221050 | 12/1983 | Japan . |
| 60-188249 | 12/1985 | Japan . |
| 61-130652 | 6/1986 | Japan . |
| 61-130653 | 6/1986 | Japan . |

OTHER PUBLICATIONS

"Service Manual No. 578" pub. by Nissan Motor Co., 6/87, pp. C-12 to C-49.

Primary Examiner—Rodney H. Bonck
Assistant Examiner—Andrea Pitts
Attorney, Agent, or Firm—Foley & Lardner, Schwartz, Jeffery, Schwaab, Mack, Blumenthal & Evans

[57] ABSTRACT

In order to shorten considerable time lag, which allows racing of an engine and lowers the transmission output torque peak, an accumulator back-up pressure acting on an accumulator for a start-up friction element is increased momentarily to quickly move a servo piston after a manual selector valve has been shifted from N range position to D range, for example, until the friction element is brought into the intial engagement stage. Subsequently, the accumulated back-up pressure is lowered to soften the frictional engagement.

13 Claims, 6 Drawing Sheets

SYSTEM FOR ALLEVIATING SELECT SHOCK IN AUTOMATIC TRANSMISSION

BACKGROUND OF THE INVENTION

The present invention relates to a system for alleviating a select shock in automatic transmission, and more particularly to a system for alleviating a select shock taking place during engagement of a friction element after a manual selector valve has been shifted from a neutral range position to any one of a plurality of drive range positions.

An automatic transmission is known wherein a driver manually shifts a manual selector valve from a neutral range position ("N" range) to a desired one of a plurality of drive range positions corresponding to a reverse range ("R" range), an automatic drive range ("D" range), a manual second range ("II" range), and a manual first range ("I" range). More specifically, all of the friction elements (clutches and brakes) are released when the neutral range position is selected, while a selected one of the friction elements is hydraulically activated when one of the drive ranges is selected.

When the driver shifts the manual selector valve from the neutral range position to one of the drive range positions under a condition where the motor vehicle is at a standstill, a predetermined friction element is engaged in response to a hydraulic fluid pressure build-up resulting from the hydraulic fluid supplied thereto from the manual selector valve. The motor vehicle is now ready for moving from a standstill. This friction element may be called as a start-up friction element.

If, during this shift of the manual selector valve, the hydraulic fluid pressure acting on the start-up friction element increases quickly, a shock taking place upon engagement of the start-up friction element becomes great since the vehicle is at a standstill. This shock is called as a selected shock.

An automatic transmission of the RE4R01A type is known. This known transmission is manufactured in Japan by NISSAN MOTOR COMPANY LIMITED. In this known automatic transmission, a N-D accumulator is provided to control a rise in the servo activating hydraulic fluid pressure acting on a start-up friction element. A forward clutch serves as the start-up friction element in this transmission.

In controlling a back-up pressure acting on the accumulator, the magnitude of the select shock is reduced if the pressure level of the back-up pressure is kept at a sufficiently low level. However, if the pressure level is lowered enough to decrease the magnitude of the select shock to a sufficiently low level, a time lag between the instant when the manual selector valve is shifted from the neutral range position to one of the plurality of drive range positions and the subsequent instant when the start-up friction element is brought into engagement becomes long.

Figure 6:
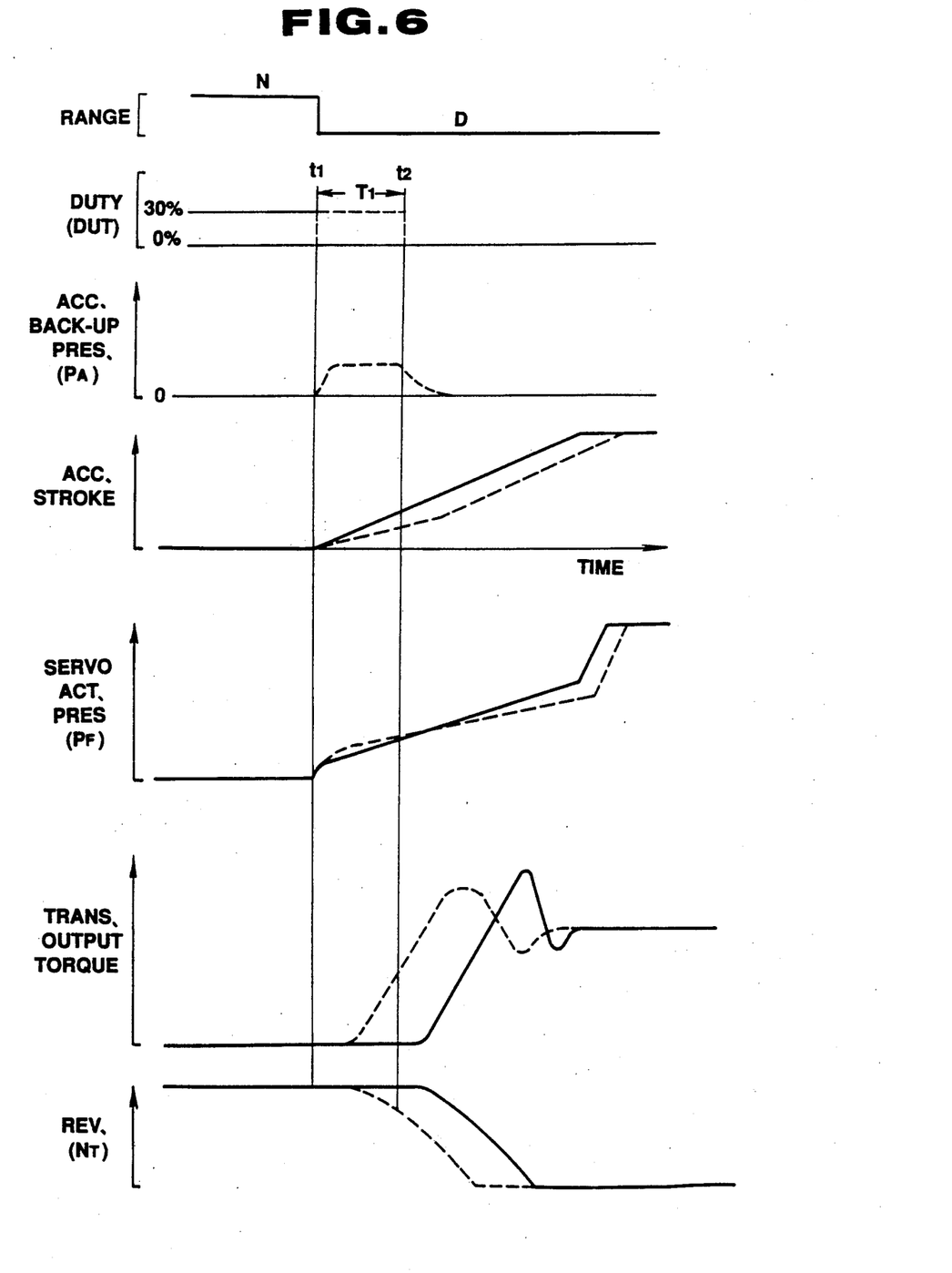
FIG. 6 are time charts showing in fully drawn line curves the variations, with regard to time, of various variables according to prior art discussed before, and in broken line curves the variations of the same variables according to the present invention.

Explaining in detail referring to the fully drawn time charts shown in FIG. 6, when the manual selector valve is shifted from the neutral range position to the drive range position at the instant $t_1$ under a condition where the accumulator back-up pressure $P_A$ is zero, the stroke of the accumulator piston, the hydraulic pressure $P_F$ supplied to the forward clutch for engagement of same, the transmission output torque, and the transmission input revolution speed $N_T$ vary with respect to time t after the above-mentioned instant $t_1$ as shown by the fully drawn line curves in FIG. 6. As is readily understood from the variation of the transmission output torque, there is a great lag between the instant $t_1$ and the completion of engagement of the forward clutch.

Thus, if the driver depresses the accelerator pedal immediately after the instant $t_1$ for quick start of the vehicle from a standstill, the engine races during the above-mentioned time lag, inducing a substantially great shock.

An object of the present invention is to shorten the above-mentioned time lag, with the magnitude of a select shock suppressed to a sufficiently low level.

SUMMARY OF THE INVENTION

In a system for alleviating a select shock in an automatic transmission according to the present invention, an accumulator back-up pressure acting on the accumulator piston in opposed relationship with a servo activating hydraulic fluid pressure acting on a start-up friction element is increased until the friction element is brought into the initial engagement stage, and it is subsequently lowered.

According to one aspect of the present invention, there is provided a system for alleviating a select shock occurring in an automatic transmission including a manual selector valve having a neutral range position and a plurality of drive range positions, a predetermined friction element that is brought into engagement in response to a servo activating hydraulic fluid pressure build-up resulting from supply of hydraulic fluid thereto from the manual selector valve, which supply begins with a first instant when the manual selector valve has been shifted from the neutral range position to one of the plurality of drive range positions, an accumulator including an accumulator piston with a pressure acting area which the servo activating hydraulic fluid pressure acts on, the accumulator piston being operative to stroke in response to the servo activating hydraulic fluid pressure thereby to control a rise of the servo activating hydraulic fluid pressure, the system comprising:

accumulator control valve means for delivering an accumulator back-up pressure acting on the accumulator piston in opposed relationship with the servo activating hydraulic fluid pressure; and control means for urging said accumulator control valve means to increase said accumulator back-up pressure till a second instant when the predetermined friction element is brought into the initial engagement stage, and lowering said accumulator back-up pressure after said second instant.

More specifically, said accumulator back-up pressure keeps said accumulator back-up pressure at a predetermined increased pressure value during a predetermined time begining with the first instant when the manual selector valve has been shifted from the neutral range position to one of the plurality of drive range positions and endding with said second instant.

According to another aspect of the present invention, there is provided a method of alleviating a select shock occurring in an automatic transmission including a manual selector valve having a neutral range position and a plurality of drive range positions, a predetermined friction element that is brought into engagement in response to a servo activating hydraulic fluid pressure build-up resulting from supply of hydraulic fluid thereto from the manual selector valve, which supply begins with a first instant when the manual selector valve has been shifted from the neutral range position to one of the plurality of drive range positions, an accumulator including an accumulator piston with a pressure acting area which the servo activating hydraulic fluid pressure acts on, the accumulator piston being operative to stroke in response to the servo activating hydraulic fluid pressure thereby to control a rise of the servo activating hydraulic fluid pressure, the method comprising the steps of:

delivering an accumulator back-up pressure acting on the accumulator piston in opposed relationship with the servo activating hydraulic fluid pressure;

increasing said accumulator back-up pressure till a second instant when the predetermined friction element is brought into the initial stage of engagement; and lowering said accumulator back-up pressure after said second instant.

DETAILED DESCRIPTION OF THE INVENTION

Figure 1:
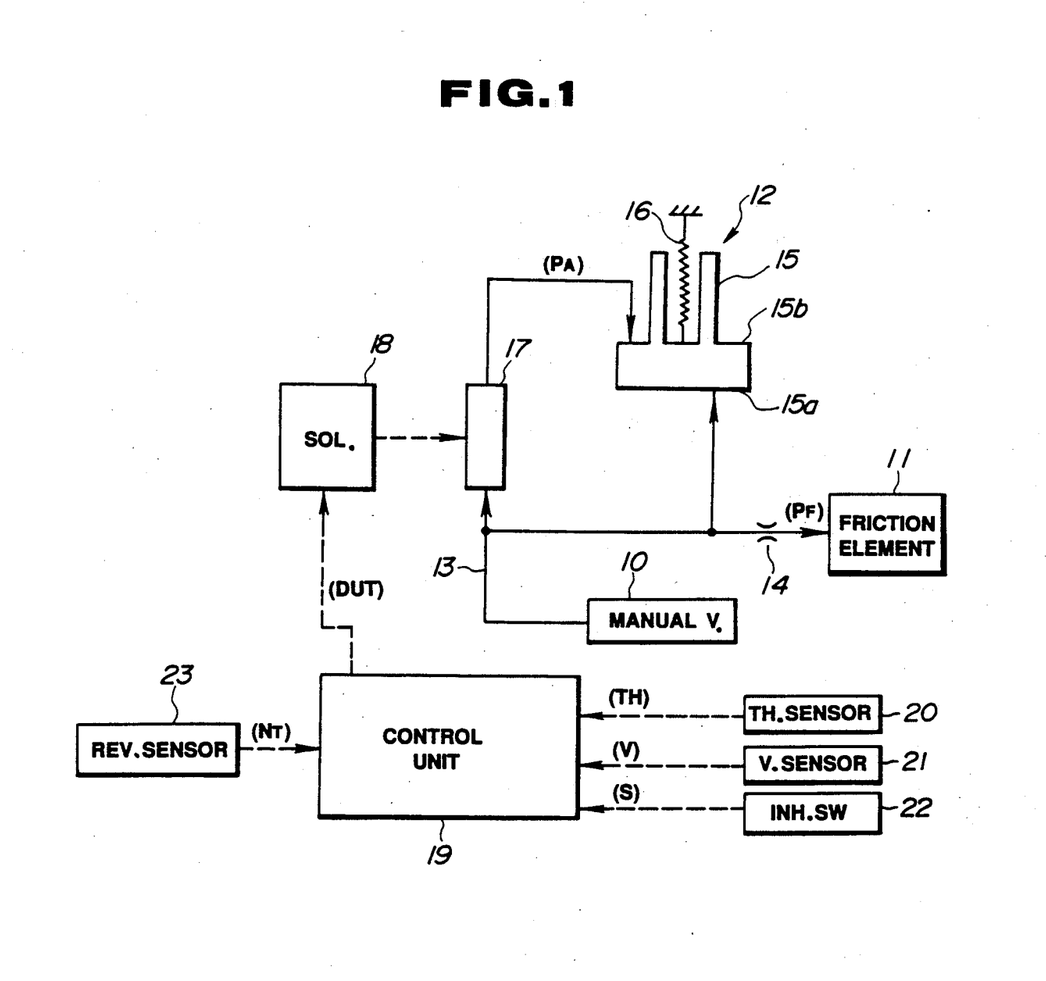
FIG. 1 is a block diagram showing a first embodiment of a system for alleviating a select shock in an automatic transmission according to the present invention.

Referring to FIG. 1, there is shown a manual selector valve 10 for an automatic transmission of the conventional type including a transmission input shaft drivingly connected via a torque converter to an output shaft of an engine and an output shaft drivingly connected to vehicle driving wheels. The manual selector valve 10 has a neutral range position ("N" range), a park range position ("P" range) and a plurality of drive range positions corresponding to an automatic drive range position ("D" range), a manual second range position ("II" range), and a manual first range position ("I" range). The manual selector valve 10 is shiftable to any one of the above-mentioned range positions by a driver via a manual selector provided near the driver seat in a usual manner. The automatic transmission also includes a start-up friction element 11. Usually, a forward clutch serves as the start-up friction element since the forward clutch is hydraulically activated when the manual selector valve 10 is shifted from the neutral range position to the automatic drive range position, or manual second range position, or manual first range position. On the other hand, a reverse clutch serves as the start-up friction element when the manual selector valve 10 is shifted from the neutral range position to the reverse range position. Thus, the term "start-up friction element" is herein used to mean the above-mentioned clutches and the like. A regulated hydraulic fluid pressure, often called line pressure, is supplied to the manual selector valve 10 by a line pressure regulator valve. Under a condition where the vehicle is at a standstill, when the driver shifts the manual selector valve 10 from the neutral range position to the automatic drive range position, the hydraulic fluid is supplied to the start-up friction element 11 at a servo chamber of a servo motor thereof including a servo piston. The hydraulic fluid flows through a fluid passage 13 past an orifice 14 and it is also supplied to an accumulator 12 to act on an accumulator piston 15 against the action of an accumulator return spring 16.

The accumulator 12 is of the conventional type and includes a stepped cylindrical chamber with a large diameter section and a small diameter section. The accumulator piston 15 has a large diameter portion slidable in the large diameter section of the stepped cylindrical chamber and a small diameter portion slidable in the small diameter section of the stepped cylindrical chamber. The accumulator spring 16 is arranged to bias the accumulator piston 15 in such a direction as to oppose a force derived from the hydraulic fluid pressure acting on the accumulator piston 15 at a large diameter end area 15a thereof. If the hydraulic fluid pressure building up at the servo chamber and acting on the servo piston of the start-up friction element 11 (which pressure is hereinafter called servo activating hydraulic fluid pressure) is expressed by $P_F$ and an accumulator back-up pressure acting on a small diameter area 15b of the accumulator piston 15 is expressed by $P_A$, the servo activating hydraulic fluid pressure $P_F$ rises as shown by the fully drawn line in FIG. 6 if the back-up pressure $P_A$ is zero. If the back-up pressure $P_A$ is increased, the rise in the servo activating hydraulic fluid pressure $P_F$ becomes quick.

The back-up pressure $P_A$ is delivered by an accumulator control valve 17 which effects pressure regulation using as a base pressure the hydraulic pressure supplied thereto from the pressure regulator valve via the manual selector valve 10. The accumulator control valve 17 is operatively associated with a duty solenoid valve 18 such that the back-up pressure $P_A$ is zero when the solenoid drive current is zero, allowing the solenoid valve 18 to be closed (that is, when the duty DUT is zero), while it inreases with an increase with an increase in the duty DUT which the duty solenoid valve 18 is opened or closed with. More specifically, the accumulator control valve 17 is of a well known pressure regulator valve which delivers an output hydraulic fluid pressure proportional to the bias force of a spring disposed in a spring chamber where a hydraulic fluid pressure variably controllable by the duty solenoid valve 18 acts. Since the hydraulic fluid pressure applied to the spring chamber assists the bias action of the spring, the output hydraulic fluid pressure varies with the hydraulic fluid pressure applied to the spring chamber.

The duty DUT is determined by a control unit 19. Supplied to the control unit 19 are output signals of a throttle sensor 20, a vehicle speed sensor 21, an inhibitor switch 22, and a transmission input revolution sensor 23. The throttle sensor 20 detects a throttle opening degree of the engine throttle valve and generates a throttle opening degree indicative signal TH. The vehicle speed sensor 21 detects the vehicle speed and generates a vehicle speed indicative signal V. The inhibitor switch 22 detects which one of the selectable range positions the manual selector valve 10 is placed at and generates a signal S indicative of the range position selected by the manual selector valve 10. The transmission input revolution speed sensor 23 detects the revolution speed of the transmission input shaft and generates a transmission input revolution speed indicative signal $N_T$. The control unit 19 is a microcomputer based system including in the usual manner a central processor unit (CPU), a read only memory (ROM), a random access memory (RAM), and an input/output interface (I/O). Based on a control program stored in the ROM, the CPU performs arithmetic operations to determine a gear position to be established by the automatic transmission using the throttle opening information indicated by the throttle opening degree indicative signal TH and the vehicle speed information indicated by the vehicle speed indicative signal V. The ROM also stores a control program illustrated by flow charts in FIGS. 2 to 4. The CPU executes this control program to determine drive duty DUT of the duty solenoid valve 18.

Figure 2:
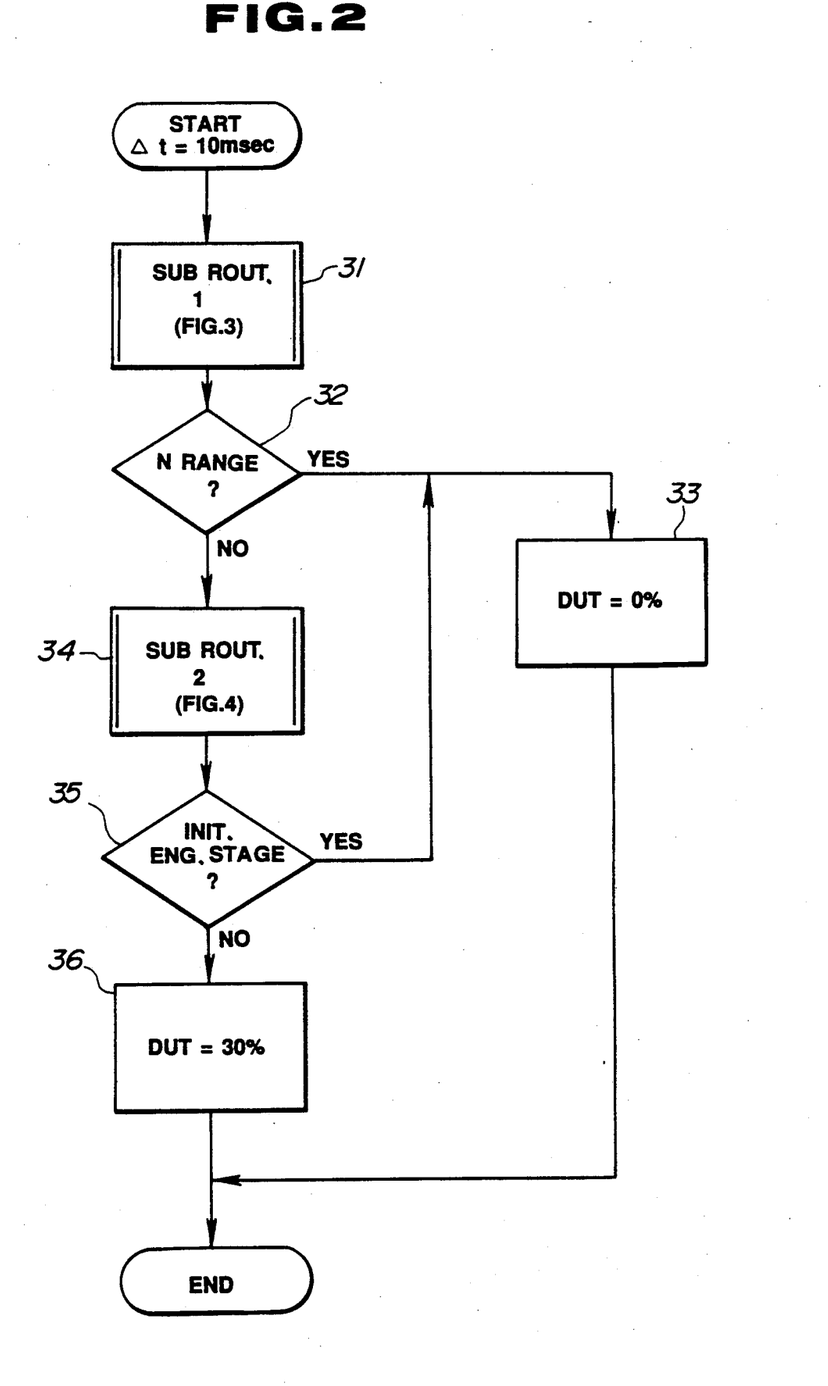
FIGS. 2 to 4 are flow charts of a control program stored in a read only memory (ROM) of a miocrocomputer based control unit.
Figure 3:
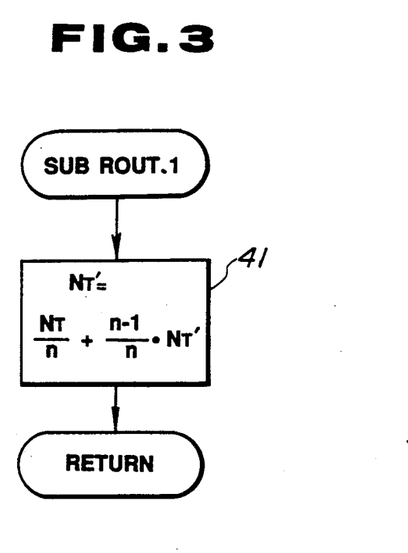

FIG. 2 shows a main routine which is executed upon elapse of an operation cycle $\Delta t$ (delta t) of 10 msec. At a step 31, a sub routine 1 is executed. This sub routine 1 is illustrated in FIG. 3. Referring to FIG. 3, at a step 41, the CPU of the control unit 19 determines an average $N_T'$ of the transmission input revolution speed $N_T$ by calculating the following equation:

$$N_T' = N_T/n + (n-1)N_T'/n,$$

where: n represents a sampling number.

FIG. 6 shows the variation of the transmission input revolution speed $N_T$ in relation to the variation of the average $N_T'$ thereof after the manual selector valve 10 has been shifted from the neutral range position to the automatic drive range position. It has been confirmed that the deviation of $N_T$ from $N_T'$, i.e., $N_T' - N_T$, becomes great at the initial engagement stage of the friction element 11. Thus, it has been decided that the friction element 11 has been brought into the initial engagement stage at the instant $t_2$ when this deviation $(N_T' - N_T)$ becomes greater than or equal to a predetermined value K.

Turning back to FIG. 2, at a step 32, the CPU makes a judgement based on the information indicated by the signal S of the inhibitor switch 22 whether or not the neutral range position (N range) is selected by the manual selector valve 10. When N range position is selected, the solenoid drive duty DUT being equal to 0% is set at a step 33. When DUT=0% is set, the solenoid valve 18 causes the accumulator control valve 17 to produce zero accumulator back-up pressure $P_A$.

Figure 4:
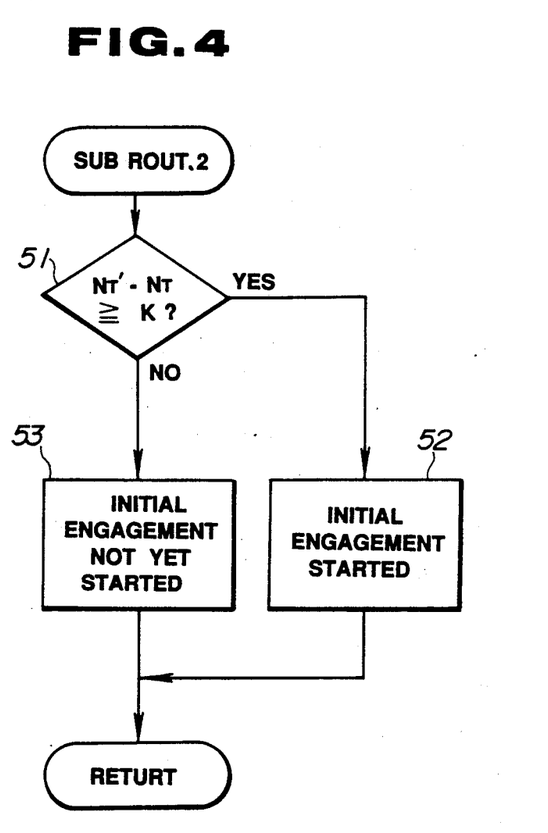
Figure 5:
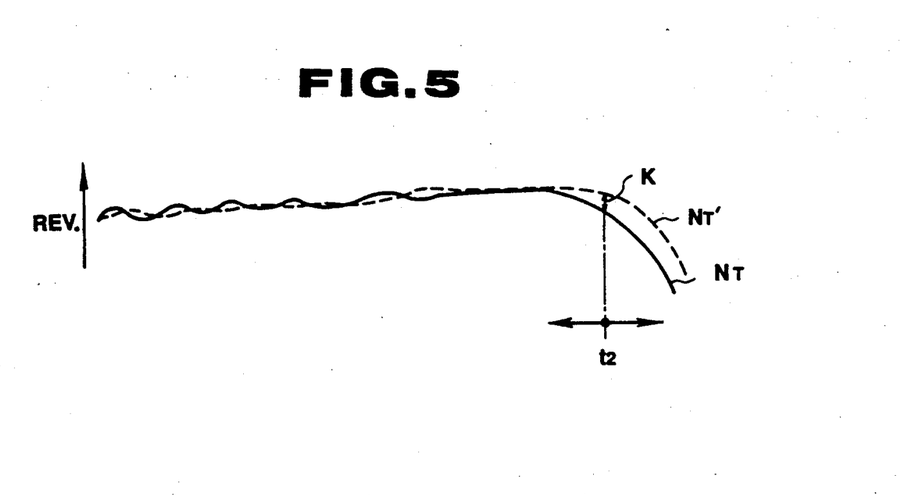
FIG. 5 is a time chart showing the variation of the transmission input revolution speed near the instant when the start-up friction element is brought into the initial engagement stage.

After the driver has shifted the manual selector valve 10 from N range position to one of the drive range positions, for example D range position, the judgement made at the step 32 turns out to NO, so that at a step 34, a sub routine 2 shown in FIG. 4 is executed.

Referring to FIG. 4, at a step 51, the CPU makes a judgement whether or not the deviation $(N_T' - N_T)$ obtained at the previous step 31 is greater than or equal to the predetermined value K. If the answer to the enquiry at the step 51 is YES, it is set at a step 52 that the friction element 11 has been brought into the initial engagement stage. On the contrary, if the answer is NO, it is set at a step 53 that the friction element 11 has not been brought into the initial engagement stage yet.

Turning back to FIG. 2, at a step 35, the CPU makes a judgement based on the result of the sub routine of FIG. 4 whether or not the friction element 11 has been brought into the initial engagement stage. When the answer to the inquiry at the step 35 is NO, the duty DUT being equal to 30% is set at a step 36, whereas when the answer is NO, the duty DUT being equal to 0% is set at the step 33. The accumulator back-up pressure $P_A$ is increased by the duty solenoid valve 18 via the accumulator control valve 17 up to a predetermined high value when the duty DUT is equal to 30%. This elevated pressure state begins after the answer to the inquiry at the step 32 has turned to NO and holds until the answer to the inquiry at the step 35 will turn to YES. The accumulator back-up pressure $P_A$ is lowered toward zero by setting DUT=0% at the step 33 when it is judged at the step 35 that the friction element 11 is brought into the initial engagement stage.

Referring to FIG. 6, the above-mentioned operation is further explained. At the instant $t_1$ when the driver shifts the manual selector valve 10 from N range position to one of the drive range positions, for example D range position, the duty DUT rises from 0% up to 30% and subsequently at the instant when the deviation $(N_T' - N_T)$ becomes equal to or greater than the predetermined value K, the duty DUT drops down to 0%.

This causes the accumulator back-up pressure $P_A$ to increase as shown by the broken line drawn curve during a time period beginning with the instant $t_1$ and ending at instant $t_2$. The speed at which the accumulator piston strokes are decreased is shown by the broken line curve, as compared to that shown by the fully drawn line curve of the before discussed prior art. This causes the servo activating hydraulic fluid pressure $P_F$ to increase quickly at the initial stage immediately after the instant $t_1$ as will be readily understood from the broken line drawn curve as compared to the fully drawn line curve in FIG. 6. As will be readily understood from the rising characteristic of the transmission output torque shown by the broken line curve, the time lag till the engagement of the friction element 11 has been shortened.

Since the friction element 11 undergoes a lost stroke during the time period between $t_1$ and $t_2$, the above mentioned quick rise of the servo activating hydraulic fluid pressure $P_F$ during this time period has nothing to do with occurrence of a select shock. Owing to this initial quick rise of the servo activating hydraulic fluid pressure $P_F$, the speed at which the servo activating hydraulic fluid pressure increases when the friction element 11 is engaged becomes slow, so that the select shock becomes small. Thus, the above-mentioned increase of the accumulator back-up pressure $P_A$ during the time period between $t_1$ and $t_2$ causes a reduction in the time lag as well as a reduction in the magnitude of select shock.

After the instant $t_2$, the duty DUT=0% is set, causing the accumulator back-up pressure $P_A$ to drop to zero. Then, the accumulator piston of the accumulator 12 resumes its normal stroke, allowing the servo activating hydraulic fluid pressure $P_F$ to increase at a gradual rate.

In the preceding example, it is judged that the time has reached the instant $t_2$ when the deviation $N_T' - N_T$ becomes equal to or greater than the predetermined value K. Alternatively, the same judgement may be made when the transmission output torque rises a predetermined amount or when the servo activating hydraulic fluid pressure $P_F$ applied to the friction element 11 rises a predetermined amount or when the engine revolution drops a predetermined amount or when a predetermined time has passed after the instant $t_1$.

Figure 7:
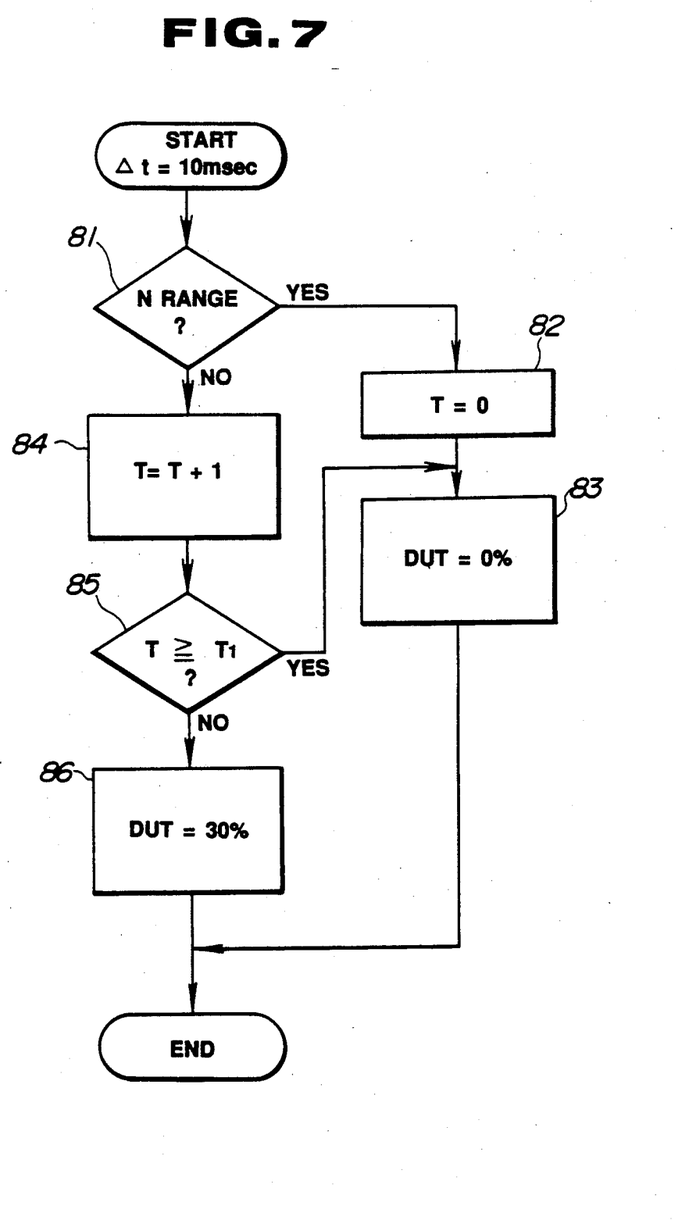
FIGS. 7 and 8 are flow charts of alternative different control programs which may be stored in the ROM of the control unit.

FIG. 7 is the flow chart of an alternative control program wherein it is judged that the time has reached the instant $t_2$ upon lapse of a predetermined time $T_1$ after the instant $t_1$.

Referring to FIG. 7, at a step 81, the CPU judges whether or not the manual selector valve 10 is placed at N range position. As long as the manual selector valve 10 is placed at N range position, a timer T is reset at a step 82, and then the duty DUT being equal to 0% is set at a step 83. This flow including the steps 81, 82, and 83 is repeated as long as the manual selector valve 10 is placed at N range position.

When the driver shifts the manual selector valve 10 from N range position to one of the drive range position, for example D range position, the control proceeds from the step 81 to a step 84 where the timer T is subject to increment so as to measure the length of time elapsed from the instant $t_1$. The time length is given by multiplying the timer T with $\Delta t$ (delta t). $\Delta t$ is an operation cycle of this program. Then, at a step 85, the CPU judges whether or not the timer T is greater than or equal to a predetermined time $T_1$ (for example, 0.3 sec, that is 300 msec.). This is where it is judged whether or not the time has reached the instant $t_2$. When the friction element 11 has not been brought into the initial engagement stage yet, the duty DUT being equal to 30% is set at a step 86 and subsequently when the friction element 11 has been brought into the initial engagement stage, the duty DUT being equal to 0% is set at the step 83.

The predetermined time $T_1$ is fixed in the program mentioned above. If it is desired to achieve more precision in control, the time $T_1$ should vary in inverse proportion to the temperature of the hydraulic fluid until the temperature increases to a predetermined value of 50° C., as shown by the charactistic in FIG. 9, since the commencement of engagement of the friction element 11 takes place earlier as the temperature of the hydraulic fluid increases and the viscosity of the hydraulic fluid drops.

Figure 8:
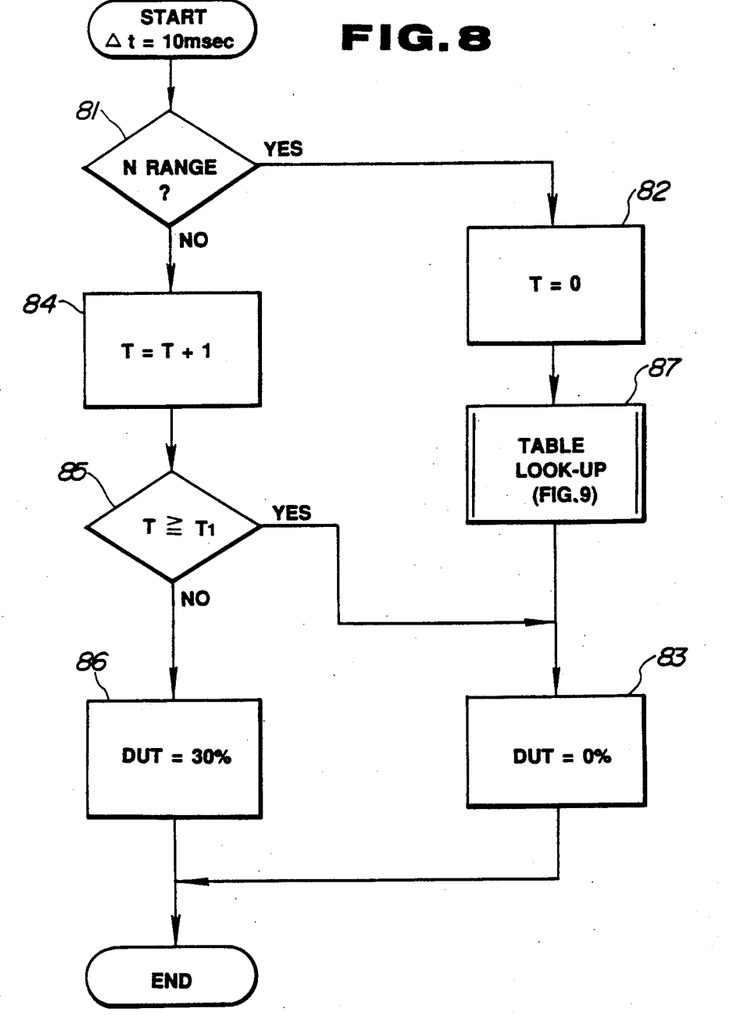
Figure 9:
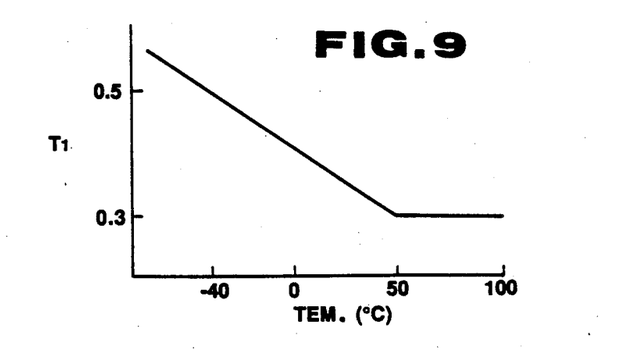
FIG. 9 is a graph showing the characteristic of time lag with respect to temperature of hydraulic fluid.

FIG. 8 is the flow chart illustrating a control program wherein the time $T_1$ is variable in inverse proportion to the temperature. Thus, this control program is different from that of FIG. 7 except the addition of a table look-up operation of a table data as illustrated by the characteristic in FIG. 9. This table look-up operation is performed at a step 87. At the step 87, the table data as shown in FIG. 9 is retrieved with a temperature of the hydraulic fluid which has been obtained by read-in operation.

What is claimed is:

1. A system for alleviating a gear select shock occurring in an automatic transmission having a transmission input shaft and a transmission output shaft, the system comprising:

a predetermined friction element that is brought into engagement in response to a servo activating hydraulic fluid pressure build-up caused by supply of hydraulic fluid thereto;

a manual selector valve having a neutral range position and a plurality of drive range positions, said manual selector valve allowing a supply of hydraulic fluid to said predetermined friction element at a first instant when said manual selector valve is shifted from said neutral range position to one of said plurality of drive range positions;

an accumulator including an accumulator piston with a pressure acting area which said servo activating hydraulic fluid pressure acts on, said accumulator piston being operative to stroke in response to said servo activating hydraulic fluid pressure thereby to control a rise of said servo activating hydaulic fluid pressure, the accumulator being operatively disposed between the manual selection valve and the friction element;

accumulator control valve means for delivering an accumulator back-up pressure acting on the accumulator piston in opposed relationship with said servo activating hydraulic fluid pressure; and control means for urging said accumulator control valve means to increase said accumulator back-up pressure during a length of time from said first instant to a second instant when said predetermined friction element is brought into the initial engagement stage, and to subsequently decrease said accumulator back-up pressure after said second instant, whereby said length of time is shortened to effectively alleviate the select shock.

2. A system as claimed in claim 1, wherein said control means urges said accumulator back-up pressure control valve means to keep said accumulator back-up pressure at a predetermined increased pressure value during said length of time.

3. A system as claimed in claim 2, wherein said control means include a sensor means for detecting a revolution speed of the transmission input shaft and generating a transmission input revolution speed indicative signal indicative of said revolution speed detected, means for repeatedly calculating an average of a set of past revolution speed values indicated by said transmission input revolution speed indicative signal, repeatedly comparing said average with said transmission input revolution speed indicative signal to determine a deviation of said average from said transmission input revolution speed indicative signal, and causing said accumulator control valve means to decrease said accumulator back-up pressure when said deviation becomes not less than a predetermined value.

4. A system as claimed in claim 2, wherein said control means include a sensor means for detecting a revolution speed of the transmission input shaft and generating a transmission input revolution speed indicative signal indicative of said revolution speed detected, and means for determining an instant when said transmission input revolution speed indicative signal is subjected to a predetermined amount of drop as said second instant.

5. A system as claimed in claim 2, wherein said control means include means for determining an instant when said servo activating hydraulic fluid pressure has increased a predetermined amount as said second instant.

6. A system as claimed in claim 2, wherein said control means include means for determining an instant when the engine revolution speed has dropped a predetermined amount as said second instant.

7. A system as claimed in claim 2, wherein said control means include means for determining an instant upon elapse of a predetermined time after said first instant as said second instant.

8. A system as claimed in claim 7, wherein said predetermined time is fixed.

9. A system as claimed in claim 7, wherein said predetermined time is variable in inverse proportion to the temperature of the hydraulic fluid until the temperature increases to a predetermined value.

10. A method of alleviating a select shock occurring in an automatic transmission having a transmission input shaft and a transmission output shaft, the automatic transmission including a manual selector valve having a neutral range position and a plurality of drive range positions, a predetermined friction element that is brought into engagement in response to a servo activating hydraulic fluid pressure build-up resulting from supply of hydraulic fluid thereto from the manual selector valve, which supply begins with a first instant when the manual selector valve has been shifted from the neutral range position to one of the plurality of drive range positions, the method comprising the steps of:

providing an accumulator including an accumulator piston with a pressure acting area which the servo activating hydraulic fluid pressure acts on, said accumulator piston being operative to stroke in response to the servo activating hydraulic fluid pressure thereby to control a rise of the servo activating hydraulic fluid pressure;

detecting the first instant when the manual sector valve is shifted from the neutral position to one of the plurality of drive range positions and generating a first instant indicative signal upon detection of the first instant;

delivering an accumulator back-up pressure acting on the accumulator piston in opposed relationship with the servo activating hydraulic fluid pressure;

increasing said accumulator back-up pressure upon generation of said first instant indicative signal;

repeatedly detecting a revolution speed of the transmission input shaft and generating a transmission input revolution speed indicative signal indicative of said revolution speed detected;

repeatedly estimating a past trend of said transmission input revolution speed indicative signal and generating a past trend indicative signal indicative of said past trend estimated;

repeatedly comparing said transmission input revolution speed indicative signal with said past trend indicative signal to obtain a deviation therebetween and generating a deviation indicative signal indicative of said deviation;

keeping said accumulator back-up pressure increased during a length of time beginning with generation of said first instant indicative signal and ending with a second instant when said deviation indicative signal satisfies a predetermined relationship with a predetermined value; and decreasing said accumulator back-up pressure after said transmission input revolution speed indicative signal has satisfied said predetermined relationship with said predetermined value.

11. A method of alleviating a select shock occurring in an automatic transmission including a manual selector valve having a neutral range position and a plurality of drive range positions, a predetermined friction element that is brought into engagement in response to a servo activating hydraulic fluid pressure build-up resulting from supply of hydraulic fluid thereto from the manual selector valve, which supply begins with a predetermined instant when the manual selector valve has been shifted from the neutral range position to one of the plurality of drive range positions, the method comprising the steps of:

providing an accumulator including an accumulator piston with a pressure acting area which the servo activating hydraulic fluid pressure acts on, the accumulator piston being operative to stroke in response to the servo activating hydraulic fluid pressure thereby to control a rise of the servo activating hydraulic fluid pressure;

detecting the predetermined instant when the manual sector valve is shifted from the neutral position to one of the plurality of drive range positions and generating a predetermined instant indicative signal upon detection of the predetermined instant;

delivering an accumulator back-up pressure acting on the accumulator piston in opposed relationship with the servo activating hydraulic fluid pressure;

increasing said accumulator back-up pressure upon generation of said predetermined instant indicative signal;

keeping said accumulator back-up pressure increased during a predetermined length of time beginning with generation of said predetermined instant indicative signal; and decreasing said accumulator back-up pressure upon elapse of said predetermined length of time.

12. A method as claimed in claim 11, wherein said predetermined legth of time is variable.

13. A method as claimed in claim 11, wherein said predetermined variable is a function of a temperature of the hydraulic fluid.

* * * * *